Dec. 13, 1932.                    P. GRAY                    1,890,780
              HEATING ELEMENT STRUCTURE AND PROCESS OF MAKING THE SAME
                              Filed Aug. 26, 1929
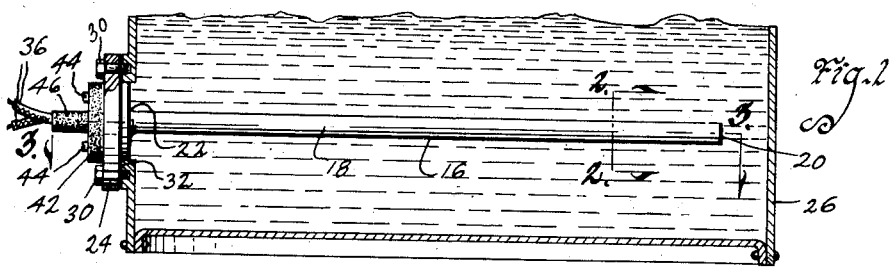
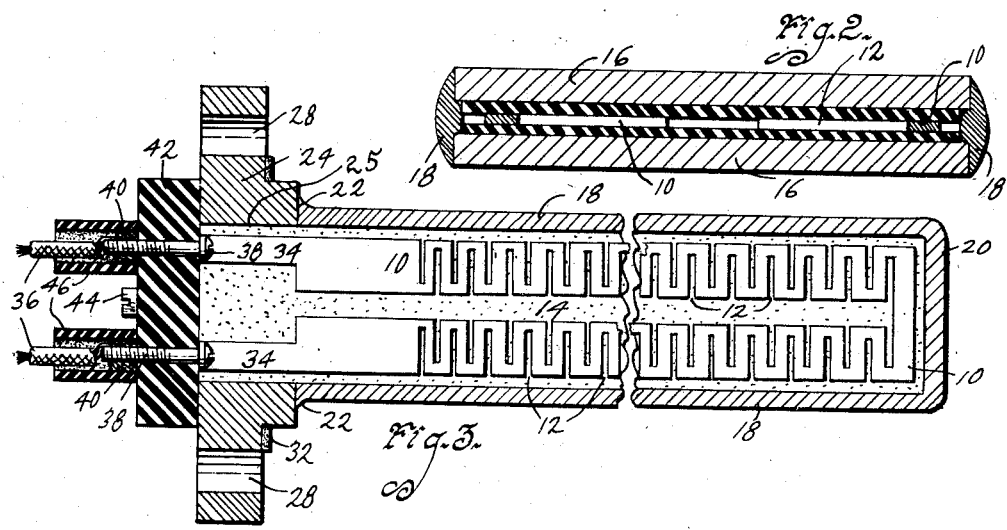
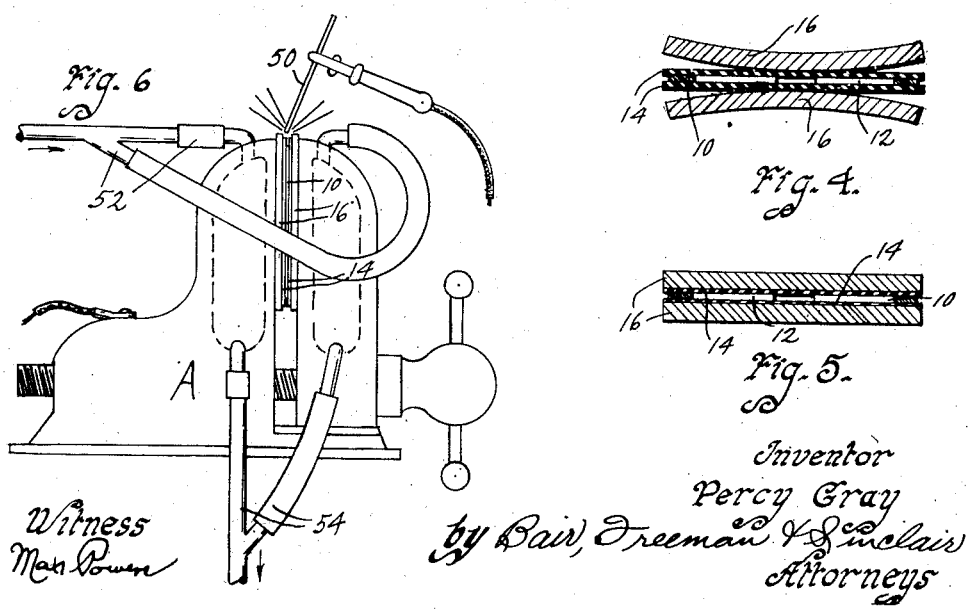
Inventor
Percy Gray
by Bair, Freeman & Sinclair
Attorneys Patented Dec. 13, 1932

1,890,780

UNITED STATES PATENT OFFICE

PERCY GRAY, OF JEFFERSON, IOWA

HEATING ELEMENT STRUCTURE AND PROCESS OF MAKING THE SAME

Application filed August 26, 1929. Serial No. 388,440.

The object of my invention is to provide a heating element structure and process of making the same of simple, durable and comparatively inexpensive construction.

A further object of my invention is to provide a heating element structure with certain details of construction, whereby a thin wall of insulation may be used between a heating element and a casing therefor with a novel means of maintaining a heavy pressure to hold the casing against the insulation and the heating element between two sides of the casing, so that a larger area of the heating element may be used without the danger of short-circuiting due to expansion and looseness of the heating element between the layers of insulation.

Such construction offers a very short heat path for the heat from the heating element to the outside of the casing.

More particularly, it is my object to provide a heating element structure consisting of a heating element between a pair of metal bars with insulation linings for the bars, such assembly being tightly clamped together, and the edges of the bars welded together for holding the parts in assembled relation with respect to each other and for forming a closed casing for the heating element, the heating element structure itself being provided for the purpose of heating water or other liquid.

A further object is to provide the metal bars which form the casing with an initial curvature bowed toward each other, so that after they are clamped and welded together, there is a heavy pressure for holding the parts together at the center, as well as at the edges.

Still a further object is to provide a process for making the heating element structure consisting of the placing of a heating element and insulation between metal bars, the clamping of such assembly together, and the welding of the edges thereof, whereby the entire device is rigidly assembled and all possibility of shifting of the heating element is eliminated as the welding metal after cooling will shrink to some extent and provide an additional clamping action after the heating element structure has cooled.

With these and other objects in view, my invention consists in the construction, arrangement and combination of the various parts of my heating element structure and in the process of making the same, whereby the objects contemplated are attained, as hereinafter more fully set forth, pointed out in my claims, and illustrated in the accompanying drawing, in which:

Figure 1 is a side elevation of a heating element structure embodying my invention, showing the structure mounted in a water tank or the like.

Figure 2 is an enlarged, cross sectional view of the same taken on the line 2—2 of Figure 1.

Figure 3 is an enlarged, sectional view taken on the line 3—3 of Figure 1.

Figures 4 and 5 are enlarged, sectional views, similar to Figure 2, showing steps in the process of making the heating element structure; and Figure 6 is a diagrammatic view showing the heating element structure clamped and being welded.

In the accompanying drawing, I have used the reference numeral 10 to indicate generally a heating element, which is preferably of ribbon-like resistance material and may be of any shape desired. On the drawing, I have shown it as having slits 12, whereby the shape of the heating element is in the form of rectangular zig-zags.

The heating element 10 is insulated from its casing by strips of insulation 14, such as mica.

It will be noted that the insulation 14 extends slightly beyond the edges of the heating element 10.

Against each strip of insulation 14 are flat bars 16, which, however, are not flat when initially assembled. The edges of the metal bars 16 are welded together, as indicated at 18, and the ends are welded as indicated at 20.

This makes a closed casing with the exception of one end, which may be welded, soldered or brazed, as indicated at 22 to an attaching flange 24 or other device, whereby the element may be connected with a water tank 26 or the like.

The flange 24 is provided with openings 28 through which cap screws 30 extend into the tank 26, and a gasket 32 is interposed between the flange and the tank to prevent leakage.

The terminal ends 34 of the heating element 10 may be connected with electric supply wires 36 in any desired manner, such as by means of screws 38 and nuts 40. The screws 38 are mounted in an insulating plate 42 attached to the flange 24 by means of screws 44.

Insulating sleeves 46 are provided, so that no parts of the metal terminals are exposed. The bars 16 extend into the opening 25 of the flange 24 and terminate adjacent the outer face thereof for the sake of rigidity, and the welded, soldered or brazed metal 22 seals the bars 16 relative to the flange 24 against leakage.

The process of constructing the heating element structure is very important. As shown in Figure 4, the metal casing bars 16 may be curved. The curvature in this figure is greatly exaggerated, as it need be but very slight.

The assembly shown in Figure 4 is then held in a clamping device of some character, such as the one indicated at A in Figure 6, and are clamped tightly in the device A, so that they assume the position shown in Figure 5.

The edges of the casing bars 16 are then welded by means of an electric welding outfit, the welding rod of which is indicated at 50.

After the welding is completed, the cross section through the heating element structure appears as shown in Figure 2. The jaws of the welding device A are preferably water-cooled and may be hollow for this purpose. A cooling liquid supply pipe is indicated at 52 and a discharge pipe is indicated at 54.

The main advantage arising from the construction of a heating element structure by my process is that a very thin insulation may be used because of the tight assembly of the parts in the finished structure, in which the edges of the bars are tightly held by the welding 18, which shrinks in cooling, and all intermediate portions of the bars 16 between their edges are held because of curvature of the bars.

In heating water, the principal cause of failure of the heating elements has been the formation of scale on the surface of the casing, which thickens the walls through which the heat must pass to the liquid in which the heating element is submerged. This results in a higher temperature of the electric heating element itself, which will cause it to burn out when the scale becomes of considerable thickness.

Sometimes burning out of the heating element causes a break-down and short circuit or a grounding of the heating element to the casing.

Against this tendency of scale to obstruct the passage of heat is the tendency of very hot metallic surfaces to crack the adhesive scale. This is caused by generation of steam in the water saturated scale and slight movement of the metallic casing relative to the scale under unequal heating conditions caused by the scale being thicker in some places.

By my construction a very short path for the heat is provided, so as to keep the outside surface of the metal enclosing bars 16 as near to the temperature of the element 10 as possible. By my construction it is practical to use a comparatively large area in contact with the water or other liquid. In heating water, it is often an advantage to use a large area which causes little or no scale to form. If scale does form, the short heat path from the element 10 to the outside of the metal enclosing bars 16 is an advantage in making the element and the insulation stand up under such conditions. Scale sometimes cracks and falls off due to the expansion of the metal of the enclosing bars, the generation of steam in the water saturated scale or curvature of the metal parts due to unequal expansion of various parts having unequal amounts of scale on them. Whatever the cause that makes the scale to fall off, it is evident that the lower the temperature can be kept in the element 10, the less destruction to the element 10 and insulation there will be. Under conditions of heavy scale formation, the metal enclosing bars 16 probably attain a temperature of 1000 degrees Fahrenheit or more. If the heat is transferred easily from the element 10 to the enclosing bars 16, the element 10 may not need to be much hotter than the enclosing bars 16 and the parts may not be damaged by excess heat.

By the use of water-cooled jaws in the clamping device A, the bars 16 are kept cool enough, while being welded to prevent damage to the edges of the insulation 14. Instead of being in one piece, each strip of insulation 14 can be made in two layers and short pieces, with the pieces of one layer staggered relative to those in the other.

Where the bars 16 are comparatively narrow for small heating elements, the curving of them may be safely dispensed with, but where the bars are wide, it is desirable to curve them, so that there is plenty of pressure at the center as well as at the edges for keeping the heating element in proper position with respect to the assembly.

Some changes may be made in the arrangement and construction of the parts of my heating element structure without departing from the real spirit and purpose of my invention and in the process of making the same, and it is my intention to cover by my claims, any modified forms of structure or use of mechanical equivalents, which may be reasonably included within their scope.

I claim as my invention:

1. A process for making a heating element structure of the character disclosed, comprising the placing of a heating element and insulation between a pair of metal bars, at least one of said bars being resilient and having out-turned edges, the clamping of the assembly formed thereby together, and the welding of the edges of the bars together for connecting them, enclosing the heating element and clamping it evenly throughout its entire surface between the bars.

2. A process for making a heating element structure of the character disclosed, comprising the placing of a heating element and insulation which form a substantially flat insulated heating element between a pair of initially curved metal bars bowed toward each other between their edges, the clamping of the assembly formed thereby together until they are substantially flat, and the welding of the edges of the bars together for connecting them, enclosing the heating element and clamping it evenly throughout its entire surface between the bars.

3. A process for making a heating element structure of the character disclosed, comprising the placing of a heating element and insulation between a pair of metal bars, one of which is tensioned to constrain it toward the other between its edges, the drawing of the edges of the respective bars together and welding them for forming a casing in which the heating element is throughout its entire surface, evenly and yieldingly pressed between the bars.

PERCY GRAY.